Patented June 25, 1946

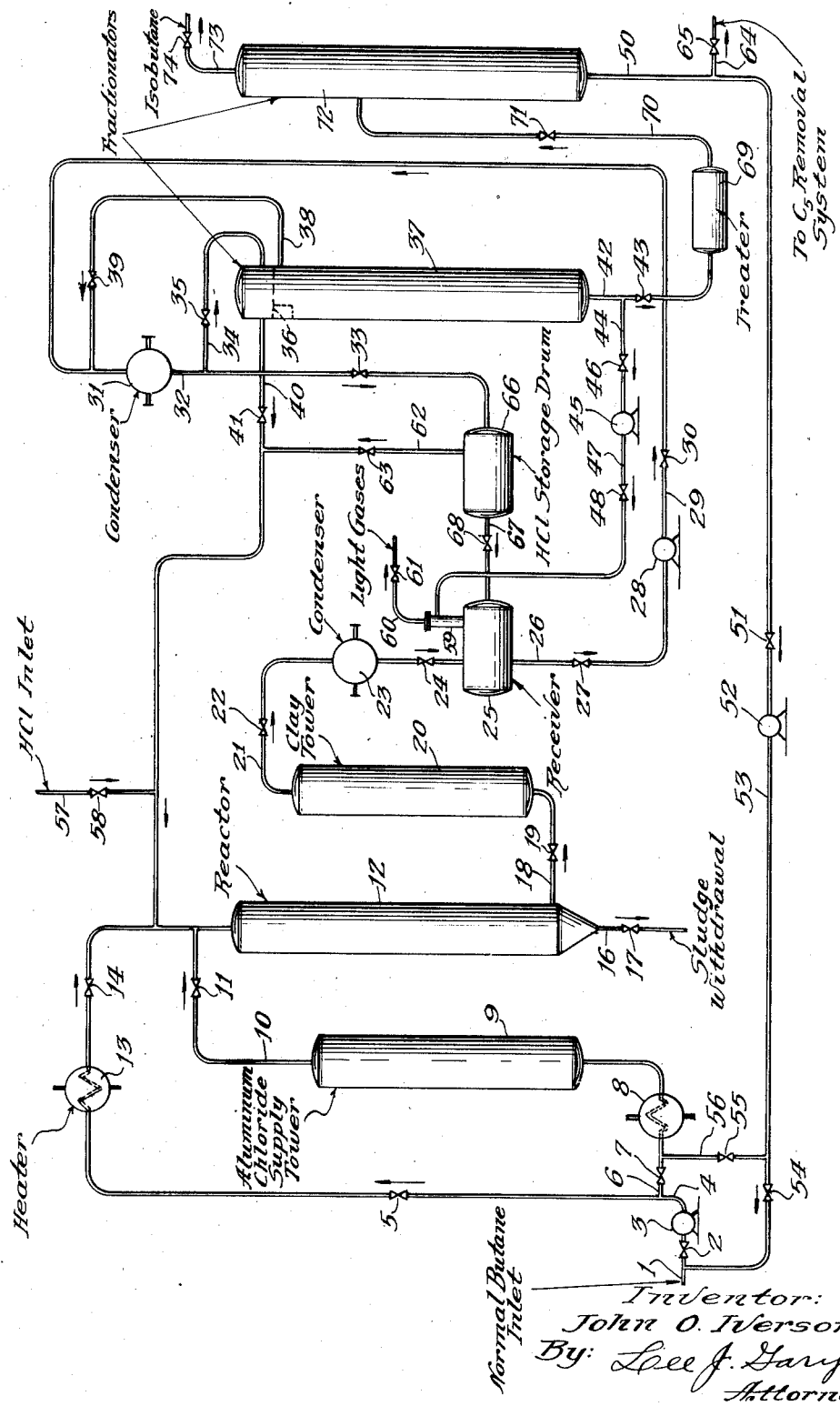

2,402,817

UNITED STATES PATENT OFFICE 2,402,817

ISOMERIZATION OF HYDROCARBONS

John O. Iverson, Chicago, Ill., assignor to Universal Oil Products Company, Chicago, Ill., a corporation of Delaware Application March 31, 1943, Serial No. 481,285

7 Claims. (Cl. 260—683.5)

This invention relates particularly to the catalytic isomerization of isomerizable saturated hydrocarbons or hydrocarbon mixtures containing substantial amounts thereof, such as straight run petroleum fractions boiling in the motor fuel range. In a more specific sense, it is concerned with a particular mode of operation involving a series of closely cooperating steps which is particularly suitable for use in connection with granular metal halide catalysts of the Friedel-Crafts type such as aluminum chloride.

In recent years, the isomerization of saturated hydrocarbons, particularly paraffinic hydrocarbons, has assumed considerable importance; thus normal butane which is the only normally gaseous paraffinic hydrocarbon capable of isomerization has been found to be considerably less reactive than isobutane since the latter compound is more easily alkylated with olefins in the presence of catalysts to form hydrocarbons of branched chain structure useful as antiknock ingredients in gasoline. Similarly, isobutane and isomeric hexanes possess properties which make them more suitable as ingredients in gasolines than their normal counterparts. Normally liquid hydrocarbon mixtures such as straight run gasoline fractions either of close cut or rather wide boiling range may be isomerized to produce a hydrocarbon mixture having a greatly increased antiknock rating over that possessed by the original charge.

It is well known that the isomerization of saturated isomerizable hydrocarbons may be effected by contacting said hydrocarbons with a metallic halide catalyst of the Friedel-Crafts type such as the chlorides and bromides of aluminum, zinc, zirconium, and iron either alone or in admixture with one another in the presence of hydrogen halides such as hydrogen chloride or hydrogen bromide.

Difficulties have been encountered in attempting continuous operation of the now commonly known type of isomerization processes wherein isomerizable hydrocarbons together with a hydrogen halide are passed over an isomerizing catalyst obtained by impregnating relatively inert granular supporting material with an active metal halide such as aluminum chloride. These difficulties are attributable in part to the deposition or accumulation of metal halide in the fractionating portion of the isomerizing system, in part to pronounced fluctuation or gradual reduction in the yield of isomerized product, and in part to undue limitations to the capacity of a given reaction equipment. The present invention aims at overcoming the aforesaid difficulties and drawbacks and permits to attain an unprecedented overall efficiency of operation and substantially constant high yields of isomerization product in a more truly continuous operation.

The present invention provides a process flow which involves the cooperation of a number of interdependent individual steps and comprises passing at least a portion of an isomerizable hydrocarbon stream through a bulk supply of metal halide catalyst and removing a portion of said catalyst by said stream, introducing the catalyst-containing effluent from said bulk supply and a hydrogen halide promoter into a preferably packed reaction zone maintained under isomerizing conditions and therein isomerizing a substantial portion of the hydrocarbon charge, flowing the reaction products therefrom through an adsorption zone containing a solid adsorbent and therein abstracting metal halide catalyst from said products, passing the reaction products from said adsorption zone into a fractionating zone wherein the hydrogen halide is substantially separated from the reaction products, and further separating the isomeric hydrocarbons from the reaction products, hydrogen halide separated as aforesaid preferably being directly recycled to the reaction zone.

In the preferred method of operation, the bulk supply zone will contain aluminum chloride and will be maintained at a temperature within the range of about 50 to 300° F. and more preferably about 150 to 250° F. under a pressure of substantially atmospheric to about 600 pounds per square inch, but so chosen as to maintain the hydrocarbons passing through this supply zone in substantially liquid phase to dissolve therein metal halide catalyst.

The reaction zone is packed with any of the well known refractory packing materials such as Raschig rings, crushed firebrick, quartz, silica-alumina composites, or the like, and is maintained at a temperature of from about 50 to 350° F. under a pressure of about substantially atmospheric to about 600 pounds per square inch. The reaction may be conducted in the liquid, mixed or vapor phase.

The hydrogen halide concentration within said reaction zone will vary dependent upon the particular hydrocarbon being charged and the temperature of operation being used but will ordinarily be less than 40 mol percent of the charge and preferably within the range of about 5 to 20 mol percent of the hydrocarbon charge.

The adsorption zone may comprise a single chamber or two or more chambers connected in series or parallel flow filled with a granular adsorbent material. The preferred adsorbent will comprise relatively inert aluminiferous materials such as bauxite, bentonite and montmorillonite or other clays either raw or acid-treated, synthetic silica-alumina composites and chars.

The fractionating zone wherein the hydrogen halide promoter is separated from the reaction products will ordinarily be operated at relatively high pressures of the order of 150 to 540 pounds per square inch. This high pressure operation not only increases the degree of fractionation obtained in the zone permitting the separation of an over-head product consisting primarily of hydrogen halide but also facilitates the recirculation of the hydrogen halide to the reaction zone without employing compressors to provide the necessary pressure.

The successful operation of each of the intermediate steps in this process flow is dependent upon the operation of the preceding step and it is their combination which imparts to the present isomerization process the considerable advantages over the isomerization processes hitherto known.

The catalyst concentration in the reaction zone is maintained at a substantially constant level by the continuous incorporation of small increments of catalyst in solution in a portion of the hydrocarbon charge passing through the bulk supply of catalyst, so that any loss of catalytic material from the reaction zone or any reduction of catalyst activity in this zone is counterbalanced by the incoming increments of catalyst. Adjustment and control of the desired temperatures in the bulk supply zone and the reaction zone independently of each other is important for attaining the desired effect in each of these zones and is greatly facilitated by regulating the portion of the charge passed through the bulk supply zone relative to that portion of the hydrocarbon charge which is supplied to the reaction zone without passing through the bulk supply zone.

The adsorption zone performs the function of substantially completely removing metal halide carried out of the reaction zone along with the hydrocarbon reactants prior to the introduction of the reaction products into the fractionating zone. The charge to the fractionating zone, therefore, is substantially free of metal halide catalyst which permits conducting the fractionating operation at pressures sufficiently high to produce an overhead product containing the hydrogen halide in satisfactory concentrations. High pressure fractionation to obtain the desired degree of separation necessarily involves high temperatures in the bottoms in the fractionating zone. If substantial quantities of metal halide catalyst are present in the fractionating zone, considerable reaction will occur between the metal halide catalyst and the hydrocarbons to form heavy metal halide-hydrocarbon complexes commonly termed "sludge" which will tend to coat the reboiler surfaces of the fractionating zone in time to prevent effective heat transfer and cause plugging with subsequent interruptions in the operation for cleaning purposes.

It is evident from the foregoing that the present invention permits a continuous operation of the isomerization process over long extended periods of time at substantially constant production of isomeric hydrocarbons without the usual difficulties encountered in the isomerization process previously known, such as loss in catalyst activity and disruptions of continuity due to undesired accumulation of the metal halide catalyst throughout the process.

Further advantages of the proposed process will be evident from the following detailed description of the attached diagrammatic drawing which illustrates in conventional side elevation one type of apparatus in which the objects of the invention may be accomplished. To simplify the explanation of the drawing, it shall be considered in connection with the isomerization of normal butane using aluminum chloride promoted by hydrogen chloride as the isomerization catalyst. However, it is not intended that this simplification should unduly limit the scope of the invention since the apparatus herein described is suitable for the isomerization not only of butane but also of other saturated isomerizable hydrocarbons.

Referring to the drawing, the normal butane charge is introduced through line 1 and commingled with the recycle stream from line 53 containing valve 54 obtained as hereinafter set forth, and the combined stream is directed through valve 2 into pump 3. All or any portion of the discharge stream from pump 3 is directed through line 4 into line 6 containing valve 7 wherein it is commingled with a recycle stream from line 56 containing valve 59 as hereinafter set forth, and the combined stream is introduced into heater 8. The combined stream passing through heater 8 is raised to a temperature sufficient to compensate for any loss of heat during its transfer into aluminum chloride supply tower 9 and still maintain the desired temperature in the tower. This portion of the charge stream is utilized as the catalyst-carrying medium to transfer the catalyst from the supply zone into the reaction zone. The amount of catalyst carried out of supply zone 9 in solution in the hydrocarbon stream is dependent upon the temperature in supply zone 9 which controls the solubility of the aluminum chloride in the hydrocarbon, and upon the quantity of hydrocarbon passed through said zone which controls the total amount of metal halide carried to the reactor through line 10 containing valve 11. It is to be understood that more than one aluminum chloride tower may be employed and may be arranged so as to permit alternate use and refilling with aluminum chloride, such refilling becoming necessary at relatively infrequent intervals in the operations of practically unlimited duration. Instead of the upward flow of the hydrocarbon stream through the aluminum chloride tower 9 as illustrated in the drawing, it may in some cases be preferable to pass this stream downwardly through this tower and then into discharge line 10.

The aluminum chloride tower is maintained at a temperature within the range of 50 to 300° F., preferably within the range of 150 to 250° F., under a pressure sufficient to maintain the hydrocarbon in substantially liquid phase.

The portion of the hydrocarbon charge which by-passes aluminum chloride tower 9 through valve 5 is utilized as a heat-carrying medium. Since this stream does not contact a metal halide catalyst in the bulk supply zone, it may be raised to a relatively high temperature during its passage through heater 13 without danger of decomposition. This stream leaves heater 13 through line 14 and is commingled with the recycle hydrogen chloride from line 40 obtained as hereinafter set forth and is commingled with the catalyst-carrying stream supplied from line 10 to the reactor 12. The excess heat carried into reactor 12 by the hydrocarbon stream from heater 13 is sufficient to maintain the total reactants at the desired conversion temperature within reactor 12.

Reactor 12 may comprise a large cylindrical vessel packed with relatively inert refractory packing material such as quartz, Raschig rings, stoneware, crushed firebrick, alumina, or the like, which serves to retain a portion of the catalyst introduced with the hydrocarbon stream into the reaction zone.

The temperatures within reactor 12 will be dependent somewhat upon the hydrogen chloride concentration, lower temperatures being ordinarily utilized with the higher hydrogen chloride concentrations. The temperature, in general may be chosen from within the approximate range of about 50 to 350° F. and preferably is maintained at a substantially constant value within the range of about 150 to 250° F. The hydrogen chloride concentration will ordinarily be less than 40 mol percent of the hydrocarbon charge and preferably within the range of about 5 to 20 mol percent. The reaction may be conducted under a substantially liquid, mixed or vapor phase. The space velocity of the hydrocarbon reactants entering reactor 12 (measured as liquid volumes of charge per volume of packed space) will vary within the range of 0.05 to 5 and preferably within the range of 0.1 to 0.75.

Heavy sludge formed during the isomerization reaction will accumulate in the bottom of reactor 12 and is withdrawn through line 16 containing valve 17. This sludge may be contacted with the various recycle streams to remove any hydrogen chloride or free aluminum chloride. The latter materials may then be returned to the operation, while residual sludge is discharged from the system.

The reaction products substantially free of sludge are withdrawn through line 18 through valve 19 into clay tower 20 wherein any aluminum chloride contained in solution or in the vapors of the hydrocarbons is removed during the passage of the reaction products through the bed of clay by adsorption or deposition thereon. The temperatures and pressures maintained within clay tower 20 will ordinarily be somewhat less than those used in reactor 12. Temperatures of the order of 50 to about 250° F. and pressures of the order of substantially atmospheric to about 400 pounds per square inch have been found to be satisfactory. Although only a single tower is shown in the drawing, two or more towers similar to tower 20 connected for either series or parallel flow may be used. The direction of the flow of the hydrocarbons through the clay towers may be either upward or downward without destroying the efficiency of the aluminum chloride removal.

The reaction products substantially free of aluminum chloride are withdrawn from clay tower 20 and are directed through line 21 containing valve 22 into condenser 23 and the condensed products directed through valve 24 into receiver 25. The hydrocarbon products containing hydrogen chloride dissolved therein are withdrawn from receiver 25 through line 26 containing valve 27 into pump 28 which discharges through line 29 containing valve 30 into condenser 31 wherein it is commingled with a side stream from fractionator 31 withdrawn through line 38 containing valve 39. The combined streams are directed from condenser 31 through line 34 containing valve 35 into the top of fractionator 37. Tray 36 shown by the dotted line consists of a blank tray equipped with a down-spout and provides a reservoir in the top portion of column 37. The liquid in the reservoir in the column is maintained at the lowest temperature within said column. The vapor in equilibrium with this liquid due to the lower vapor pressure of the liquid has the highest concentration of hydrogen chloride. This vapor is withdrawn through line 40 containing valve 41 and recycled to reactor 12. Any make-up hydrogen chloride or the amount necessary for starting the operation is introduced through line 57 containing valve 58 into line 40. Storage facilities are provided for the hydrogen chloride in case the operation is to be discontinued or intermediate storage becomes desirable. Thus, part or all of the hydrogen chloride may be introduced from line 32 through valve 33 into storage drum 66. This hydrogen chloride may be reintroduced into the plant through line 62 containing valve 63 or through line 67 containing valve 68.

The bottoms from the hydrogen chloride fractionator are withdrawn through line 42 containing valve 43 and are directed through treator 69 wherein any residual amount of hydrogen chloride may be removed by caustic wash or any similar method. The hydrogen chloride-free stream is directed through line 70 and valve 71 into fractionator 72 wherein the isobutane is separated to be then removed as overhead product through line 73 containing valve 74. A portion of the bottoms from the hydrogen chloride fractionator may be withdrawn through line 44 containing valve 46 into pump 45 which discharges through line 47 containing valve 48 into an absorber 59 wherein it is contacted with the light gases prior to their being withdrawn from the system to absorb the hydrogen chloride therefrom. To prevent a build-up of light gases in the system, these gases may be withdrawn from absorber 59 through line 60 containing valve 61.

The bottoms from fractionator 72 containing normal butane and minor amounts of $C_5$ and heavier hydrocarbons formed during the isomerization reaction are directed through line 50 containing valve 51 into pump 52 which discharges through line 53 containing valve 54 into line 1 as hereinbefore set forth. A portion of this recycle stream may be withdrawn through line 55 containing valve 56 and passed through aluminum chloride supply tower 9 along with the fresh feed as hereinbefore set forth. To prevent a build-up of $C_5$ and heavier hydrocarbons in the feed to the aluminum chloride supply tower, a portion of the bottoms of fractionator 72 may be withdrawn through line 64 containing valve 65 and further fractionated to remove the normal butane which may be recycled to the operation.

The following example is given to illustrate the type of results obtainable in the operation of the process described in the foregoing specification but without any intention of limiting the scope of the invention in exact accordance therewith.

*Example*

The charge to the plant consists of 94 mol percent of normal butane, 5 mol percent isobutane, and one mol percent pentanes. The temperature of the aluminum chloride supply tower is about 160° F. and the temperature of the packed reaction chamber is about 220° F. The pressure in the aluminum chloride supply tower is about 350 pounds and the pressure in the reaction zone is maintained around 325 pounds per square inch. The hydrocarbon charge is introduced at a liquid hourly space velocity of 0.3 and the hydrogen chloride is maintained in the reaction zone in an amount of about 13 mol percent of the charge by recycling and the use of make-up. The clay tower which follows the reactor and removes the aluminum chloride from the reaction products prior to the separation of the hydrogen chloride is operated under a pressure of about 210 pounds per square inch and at a temperature of 190° F.

The hydrogen chloride fractionator is operated under a pressure of 450 pounds per square inch with a top temperature of 87° F. and a bottom temperature of 270° F.

From the above operation, the following yields are obtained:

| | |
|---|---|
| Ethane and propane, mol percent | 1.3 |
| Isobutane, mol percent | 40.1 |
| Normal butane, mol percent | 56.8 |
| Pentanes, mol percent | 1.8 |

The use of the herein disclosed process flow permits the conduction of the isomerization with substantially constant yields of isobutane over an unusually long period of operation. No operating difficulties due to deposition or accumulation of aluminum chloride in the plant equipment are encountered.

I claim as my invention:

1. In the isomerization of saturated hydrocarbons wherein the hydrocarbons are subjected in a reaction zone to the action of a metal halide isomerizing catalyst under isomerizing conditions and in the presence of a hydrogen halide, the method which comprises removing from said zone a hydrocarbon product containing metal halide and hydrogen halide, contacting said product with a solid adsorbent capable of separating the metal halide from said product, thereafter fractionating said product containing hydrogen halide under a superatmospheric pressure substantially in excess of the pressure maintained in said reaction zone to form a hydrocarbon liquid and a gas containing the hydrogen halide, and returning said gas to the reaction zone under the pressure of the fractionating step.

2. The process of claim 1 further characterized in that said solid adsorbent comprises a relatively inert aluminiferous adsorbent.

3. The process of claim 1 further characterized in that the saturated hydrocarbon treated in the reaction zone comprises an isomerizable paraffinic hydrocarbon.

4. The process of claim 1 further characterized in that said isomerizing catalyst comprises an aluminum halide.

5. The process of claim 1 further characterized in that said metal halide and hydrogen halide comprise aluminum chloride and hydrogen chloride respectively.

6. The process of claim 1 further characterized in that the mixture of reactants and hydrogen halide is subjected in the reaction zone to an isomerizing temperature under sufficient pressure to maintain at least a substantial portion of said mixture in liquid phase, and the reaction products are passed through the solid adsorbent under a lower average temperature than maintained in said reaction zone.

7. The process of claim 1 further characterized in that the mixture of reactants and hydrogen halide is subjected in the reaction zone to an isomerizing temperature under a pressure such that said reactants and hydrogen halide are maintained in substantially vapor phase and the reaction products are passed through the solid adsorbent under a lower average temperature than maintained in said reaction zone.

JOHN O. IVERSON.